Jan. 25, 1949. D. L. BUTLER 2,460,060
NEGATIVE CARRIER WITH DENSITY COMPARISON SCALE
Filed Nov. 5, 1945
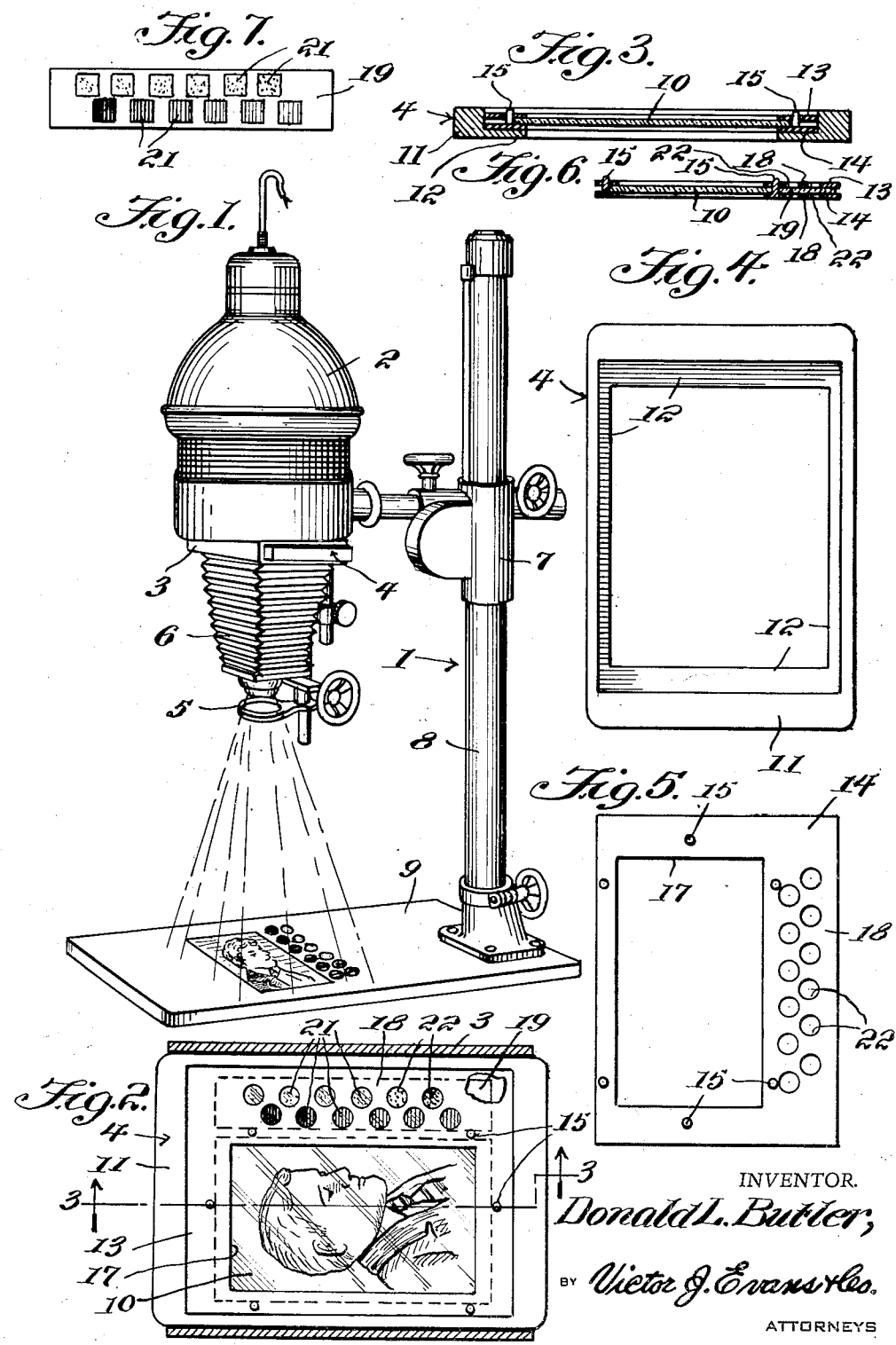
INVENTOR.
Donald L. Butler,
BY Victor J. Evans & Co.
ATTORNEYS Patented Jan. 25, 1949

2,460,060

UNITED STATES PATENT OFFICE 2,460,060

NEGATIVE CARRIER WITH DENSITY COMPARISON SCALE

Donald L. Butler, Saint John's, Newfoundland

Application November 5, 1945, Serial No. 626,717

3 Claims. (Cl. 88—24)

My present invention, in its broad aspect, has to do with improvements in devices for determining the degree of exposure of negatives in photographic enlargements, and is designed to provide an accurate, simple, and effective guide in determining the degree of exposure of sensitized paper in operation where many enlargements are to be made, and especially, my invention is designed to present the guide with a projection of the negative, but not as a part of the negative or the sensitized medium, so that simultaneous comparison may be made by the operators as the procedure of enlargement is carried on. In its present embodiment, my invention, for purposes of illustration, is shown in connection with a standard photographic enlargement apparatus, and the guide is shown as a part of the negative carrier, but not in proximity with the space where the negative is placed on the carrier so that projection of the negative upon the sensitized medium will be in visual proximity with the scale or guide for simultaneous comparison during the process of exposure for enlargement. My invention is not wholly dependent upon the structure of any particular standard enlargement machine or any particular negative carrier. My scale is graded to fine shades of density and is practical and efficient for the purposes intended.

Other and equally important objects and advantages of my invention will be apparent from the following description and drawings, and it is pointed out that changes in form, size, shape, materials, and construction and arrangement of parts are permissible and within the purview of my broad inventive concept, and the scope of the appended claims.

In the drawings, wherein I have illustrated a preferred form of my invention:

Figure 1 is a perspective view of a conventional photographic enlargement machine in which my invention is shown embodied;

Figure 2 is a top plan view of the negative carrier showing the negative to be enlarged and my scale in proximity therewith;

Figure 3 is a section on the line 3—3 of the negative carrier shown in Figure 2;

Figure 4 is a view of the carrier frame;

Figure 5 is a detail view of the bottom plate of the negative carrier, and shows the opening through which the negative is exposed, and the openings for the projection of the graduations in the scale;

Figure 6 is a cross section through the negative carrier and

Figure 7 is a detail view of my scale per se.

In the drawings, wherein like characters of reference are used to designate like or similar parts:

The numeral 1 designates a conventional type of photographic enlarger, which has a lamp housing 2, below which is the housing 3 for slidably receiving the film negative carrier 4. The lens structure 5 is connected with the carrier assembly by a bellows 6. The aforementioned assembly is adjustably mounted, as at 7, on a standard 8 carried by the base board 9 on which the sensitized material is placed and upon which the enlargement of the negative 10 is projected. As shown in Figures 2 to 6, the film negative carrier 4 comprises a frame 11 formed with a continuous flange 12, on which the film negative carrier is supported, a top plate 13 and a bottom plate 14. The bottom plate 14 is provided with upstanding attaching pins 15 which are adapted to be received in apertures in the plate 13 in alignment with the pins 15, thereby holding the plates in alignment to prevent relative movement thereof. It will be noted that the negative is projected through an opening 17 and that the relatively wide side 18 of the plates 13 and 14 are provided with a space to receive the elongated transparent strip that forms a guide 19 which is designed to extend parallel with, and in proximity to the film negative 10, but not to overlap the same. The strip is formed with rows of aligned square graduated shaded areas 21 of different densities, and the plates 13 and 14 with aligned openings 22 through which the light projects the marks upon the base board, as at 9, adjacent but not overlapping the enlarged negative 10, as shown in Figure 1, so that direct comparisons can be made during the process of forming the enlargement. It will be noted that the attaching pins extend through plates 13 and 14 between the negative and the scale.

From the foregoing, it is believed that the objects and advantages of my invention will be apparent, but it is again pointed out that interpretation of the scope of my invention should only be conclusive when made in the light of the subjoined claims.

I claim:

1. A density indicator for a photographic enlarger having a base plate, light housing, and a negative carrier, said negative carrier comprising a frame with a series of openings therethrough, a strip of transparent material in the carrier having a plurality of graduated shaded areas thereon with the density of the shaded areas varying from substantially clear to comparatively opaque corresponding to the density of areas of a negative, and means mounting said transparent strip in one side of the negative carrier with each of said shaded areas registering with one of the openings in the series of openings through the said carrier.

2. A negative carrier for photographic enlargements, comprising a frame having a series of openings therethrough, a plate with a series of openings therethrough and having pins extending upwardly therefrom for positioning a superimposed plate, a corresponding superimposed plate with openings therein to receive the pins of the former plate, and also having a series of openings therethrough positioned to register with the series of openings of the plate carrying the positioning pins, and a transparent strip having a plurality of graduated shaded areas with the density of the shaded areas varying from substantially clear to comparatively opaque corresponding to the density of areas of a negative, said strip incorporated in said carrier between the plates thereof, and positioned so that each of said shaded areas registers with a different opening in the said series of openings.

3. In a negative carrier for photographic enlargers, the combination which comprises, a frame having a picture opening therein and provided with an extended area at one side having a series of openings therethrough, and a transparent strip positioned in the extended area of the carrier and having a plurality of graduated shaded areas thereon with the density of the shaded areas varying from substantially clear to comparatively opaque corresponding to the density of areas of a negative, said transparent strip positioned so that each of the said shaded areas registers with one of the openings of the series of openings through the extended area of the carrier.

DONALD L. BUTLER.

REFERENCES CITED

The following references are of record in the file of this patent:

UNITED STATES PATENTS

| Number | Name | Date |
|---|---|---|
| 182,099 | Brice | Sept. 12, 1876 |
| 1,621,991 | Mayer | Mar. 22, 1927 |
| 2,249,229 | Rogers | July 15, 1941 |
| 2,294,585 | Thomson | Sept. 1, 1942 |
| 2,322,044 | McFarlane et al. | June 15, 1943 |